United States Patent [19]

Fee

[11] 4,253,674
[45] Mar. 3, 1981

[54] SHEAR SEAL ASSEMBLY

[75] Inventor: David M. Fee, Groveland, Ill.

[73] Assignee: Caterpillar Tractor Co., Peoria, Ill.

[21] Appl. No.: 95,192

[22] PCT Filed: Aug. 30, 1979

[86] PCT No.: PCT/US79/00665

§ 371 Date: Aug. 30, 1979

§ 102(e) Date: Aug. 30, 1979

[51] Int. Cl.³ .................. F16J 15/32; B62D 55/16
[52] U.S. Cl. ................................... 277/5; 277/30; 277/97; 277/165; 277/DIG. 9; 305/11
[58] Field of Search ............ 277/5, 12, 30, 42, 43, 277/81 R, 92, 95, 97, 165, DIG. 9; 305/11, 42

[56] References Cited

U.S. PATENT DOCUMENTS

| 418,439 | 12/1889 | Brill | 277/95 |
|---|---|---|---|
| 2,911,840 | 11/1959 | Muller et al. | 305/11 |
| 2,944,843 | 7/1960 | Colby | 277/96 |
| 3,094,335 | 6/1963 | Shenk | 277/5 |
| 3,158,923 | 12/1964 | Reinsma | 305/11 X |
| 3,218,107 | 11/1965 | Reinsma | 277/5 |
| 3,620,578 | 11/1971 | Fix | 305/11 |
| 3,680,924 | 8/1972 | Otto et al. | 305/11 |

FOREIGN PATENT DOCUMENTS 879496 6/1953 Fed. Rep. of Germany .

Primary Examiner—Robert S. Ward, Jr.

Attorney, Agent, or Firm—Wegner, Stellman, McCord, Wiles & Wood

[57] ABSTRACT

A shear seal assembly (65) has an inner sleeve (66) and an outer sleeve (68) with an elastomeric material bonded therebetween. One sleeve (66,68) has a circumferential groove (74), formed in the exposed wall (76) thereof in which groove (74) an O-ring (78) nests. The assembly is mounted between two telescoping members (28,38) that have limited relative rotation. The sleeve without the groove (74) is press fit on or is one member (28,38) and the sleeve (68) with the groove (74) will be spaced from the other member (28,38) so that the O-ring (78) will extend from the groove (74) into sealing contact with said other member (28,38). Clips or retainers (82) are provided for seating the grooved sleeve (66,68) to said other member (28,38) whereby limited relative rotation or oscillation between the members takes place without rupturing the elastomeric material. The shear seal can be removed without destroying the shear seal structure so that it can be reused.

9 Claims, 4 Drawing Figures

SHEAR SEAL ASSEMBLY

DESCRIPTION

TECHNICAL FIELD

This invention relates to shear seals and, more particularly, to a shear seal between two members having limited relative rotation therebetween.

BACKGROUND ART

Shear seals have been known and used for a long time. The traditional shear seals have been reasonably effective in accomplishing their intended function of permitting one member to rotate relative to another to a limited degree while still effecting a seal between the opposite sides of the shear seal.

U.S. Pat. No. 3,680,924 to Robert J. Otto et al, issued Aug. 1, 1972, shows a shear seal for a track pin of an endless track wherein an inner metal ring of the seal is pressed or cemented to one link and the outer metal ring is pressed or cemented to the other link with an elastomeric ring bonded between the metal rings. To gain access to the bearing requires that the elastomeric ring be destroyed in order to remove the shear seal from its mounting. In addition, the relative tolerances between the metal rings and their mating surfaces must be closely controlled.

U.S. Pat. No. 3,218,107 to H. L. Reinsma, issued Nov. 16, 1965, shows a shear seal having an inner sleeve and an outer sleeve joined by an elastomeric ring. The sleeves are press fitted onto a pin and into a link, respectively, not only to provide a seal, but also to permit limited relative rotation between the pin and the link. On occasion when it is necessary to remove the shear seal, it is more than likely that the shear seal will be damaged or destroyed in order to remove it from its press fit seats. Once again, the relative tolerances between the sleeves and their mating surfaces must be closely controlled.

DISCLOSURE OF INVENTION

In one aspect of the present invention a shear seal assembly is provided for sealing between two members having limited relative rotation therebetween. The shear seal has an inner circular element and an outer circular element with one of said circular elements being press fit with respect to one of said members. An elastomeric disc is bonded between said inner circular element and said outer circular element to permit limited relative rotation between said circular elements. A groove is formed in an exposed wall of the other of said circular elements with an elastic O-ring seated in said groove and sealing said other circular element to the other of said members. Clips are anchored to said other member and urge said other circular element into fixed relationship with said other member.

The improved construction is very effective in sealing the respective sides of the shear seal assembly and permits the limited relative rotation between the members. When it is desirable or necessary to remove the shear seal, the clips are removed which free the one member from the other so that the members can be disassembled, the seal removed and the service performed. The seal can then be reused as desired. The use of the O-ring to effect the second sealing function makes it possible to operate with much looser tolerances on the grooved sleeve and on the surface of the member facing the grooved sleeve in that the elastic nature of the O-ring will accommodate for wider tolerance variations without adversely effecting the sealing abilities of the overall shear seal.

BEST MODE FOR CARRYING OUT THE INVENTION

Figure 1:
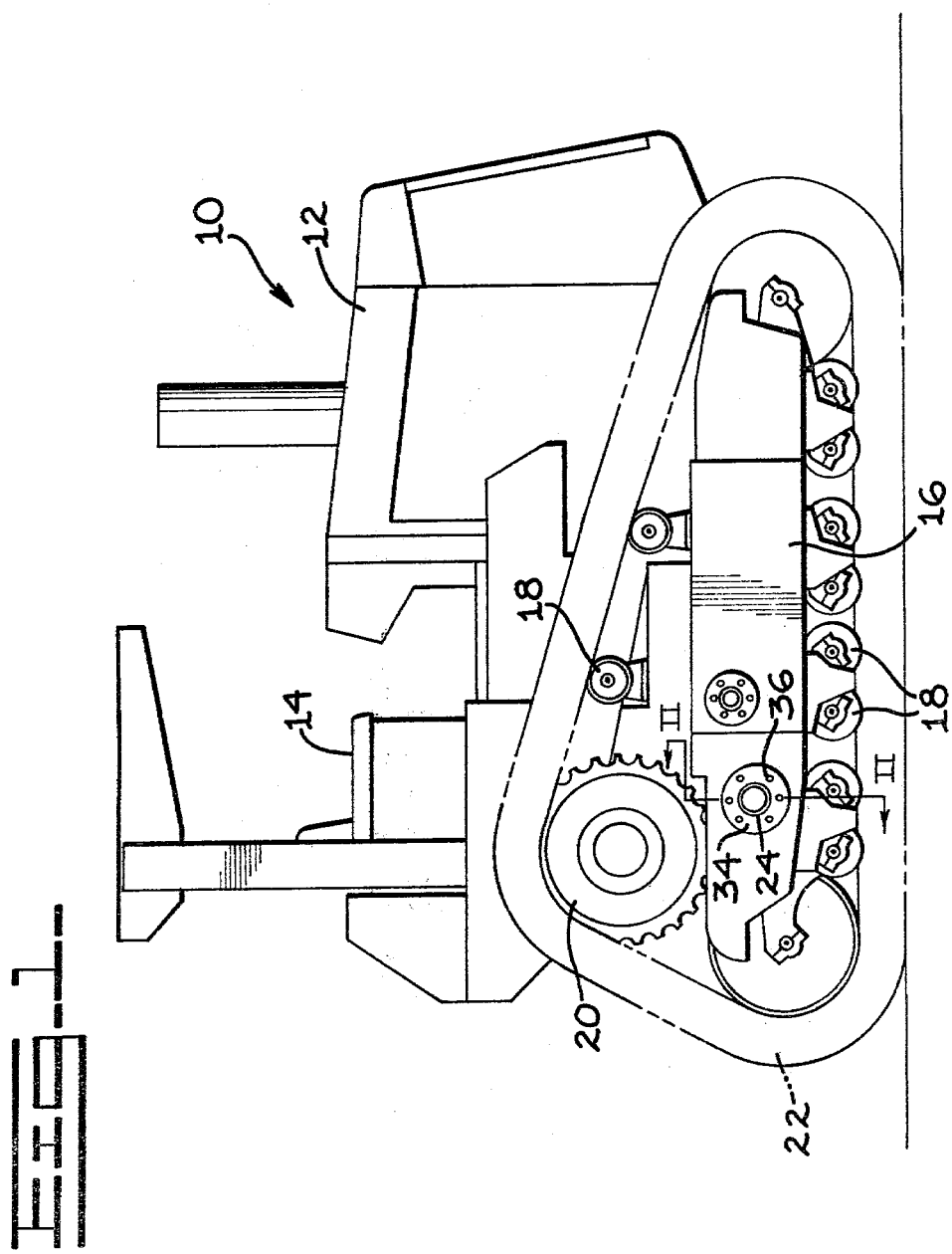
FIG. 1 is an elevational view of a track-type tractor embodying my invention.

A tractor 10 is illustrated in FIG. 1 and includes an engine compartment 12, an operator's station 14, a track roller frame 16 supporting the track rollers 18, a track drive sprocket 20 and a track 22 encircling said track rollers 18 and drive sprocket 20. A trunnion ball 24 projects from the track roller frame 16 and is used to connect one of the arms of a C-frame (or the like), not shown, to the tractor 10. The C-frame is connected to a bulldozer blade, a push blade, or the like.

Figure 2:
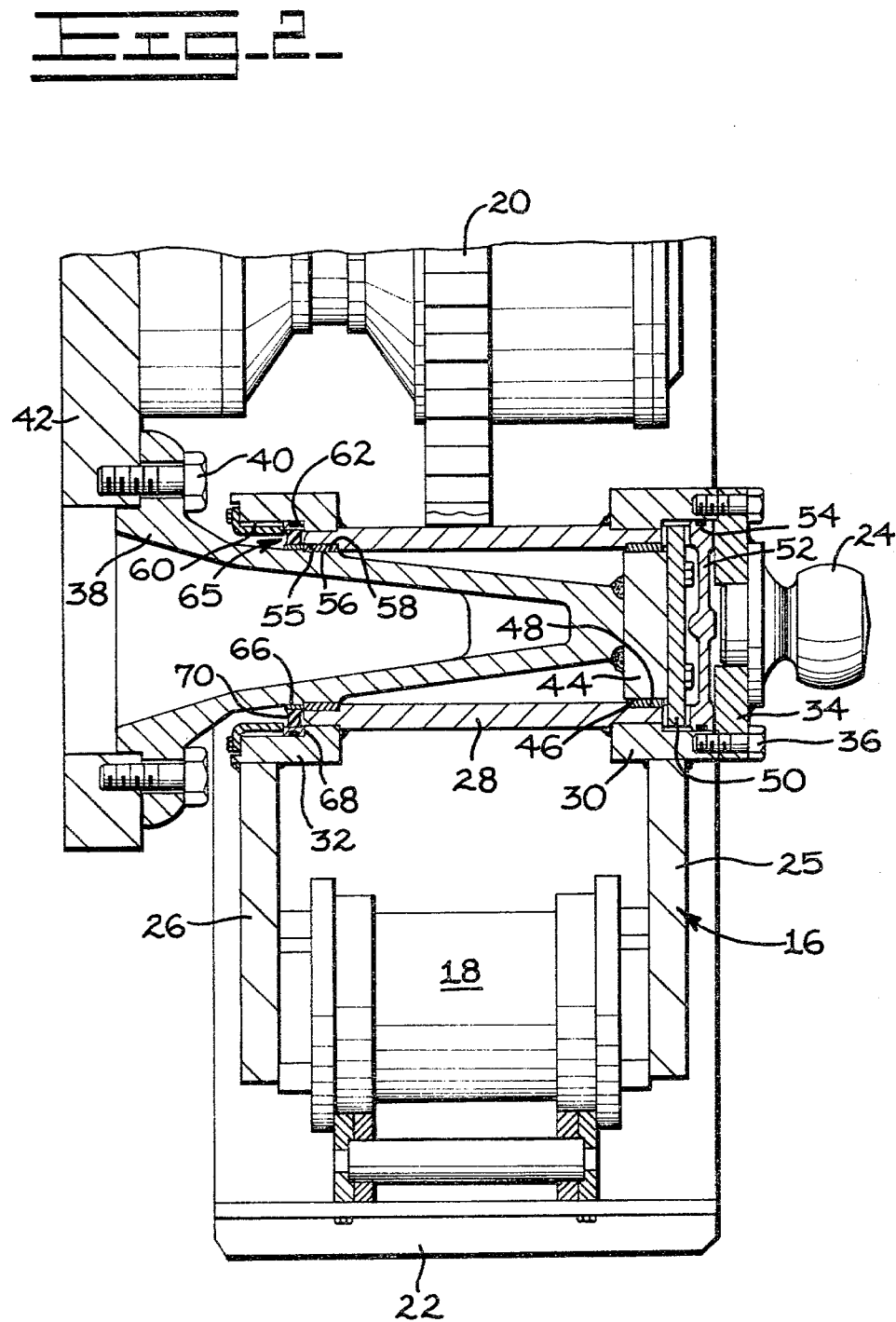
FIG. 2 is an enlarged cross-sectional view taken along the line 2—2 of FIG. 1.

As viewed in FIG. 2, the track roller frame 16 has a front wall 25 and a back wall 26 with a tubular housing 28 being secured therebetween by end collars 30 and 32 which are welded to said walls 25,26. The collars 30 and 32 and the housing 28 are treated hereinafter as one member. The trunnion ball 24 is mounted on a circular plate 34 which is bolted at 36 to the collar 30.

A pivot shaft 38 is bolted at 40 to a frame 42 and projects outwardly into telescoping relationship with the tubular housing 28. The shaft 38 has a circular guide 44 welded on the forward end thereof. The guide 44 is surrounded by a bearing sleeve 46 which rides in a bearing recess 48 in the housing 28. A plate 50 is bolted to the guide 44 and overlaps the edges thereof to retain the pivot shaft 38 from axial escape or excess axial movement relative to the housing 28. A cap 52 is nested in the collar 30 and has a sealing ring 54 bearing against the inside of the collar 30 to seal lubricant in the housing 28. The end of the housing 28 inside the collar 32 has a bearing recess 55 in which is seated a bearing sleeve 56 which surrounds and rides on a bearing surface 58 on an intermediate portion of the pivot shaft 38. The collar 32 is undercut at 60 to provide an outwardly facing shoulder 62 which substantially aligns with the one axial end wall of the bearing sleeve 56.

Figure 3:
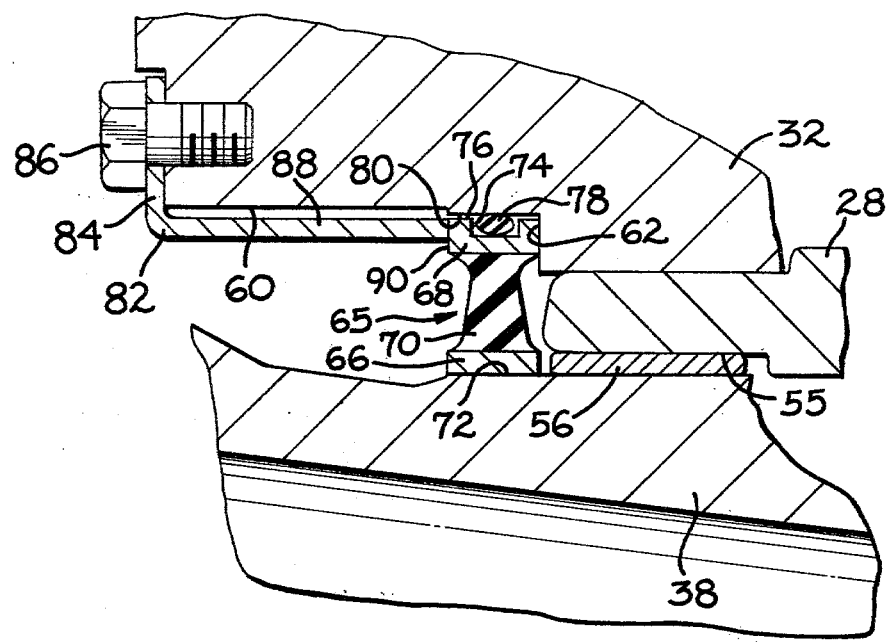
FIG. 3 is a further enlarged view of the cross section of the shear seal of FIG. 2.
Figure 4:
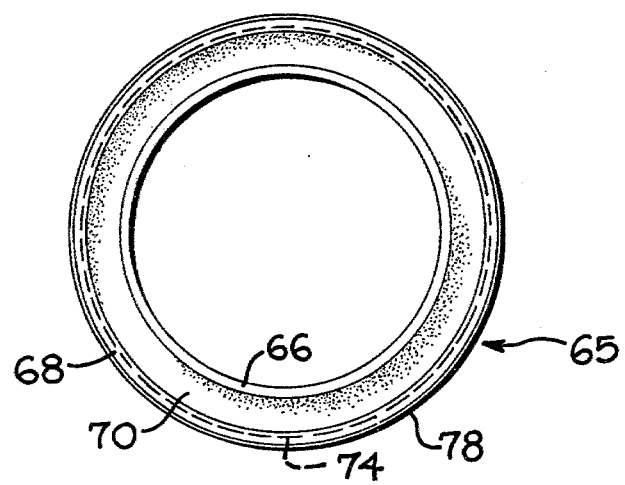
FIG. 4 is an end view of my improved shear seal.

A shear seal assembly 65 is provided between the pivot shaft 38 and the housing 28 to provide a seal to prevent contaminants from entering the bearing area of the pivot shaft 38 and to prevent lubricants in the bearing area of the shaft from escaping. At the same time, the shear seal 65 will permit limited relative rotation between the pivot shaft 38 and the housing 28. In practice, the relative rotation or oscillation amounts to plus or minus 3° from the unstressed position. As is best shown in FIG. 3, the shear seal 65 comprises an inner sleeve 66 of cylindrical shape and an outer sleeve 68, likewise, of cylindrical shape. The sleeves 66,68 are joined by a ring or disc 70 of elastomeric material which is characterized by elastic, rubber-like properties, so that the ring or disc 70 will return to its original shape when a load is removed. The material may be any one of those classes of polymerized compounds characterized by elastic, rubber-like properties, synthetic rubber, natural rubber, or various plastics. The ring or disc 70 is bonded in a conventional manner to the sleeves 66,68 so as to create an integral shear seal. The material of the ring or disc 70 is sufficiently elastic as to permit relative rotation between the sleeves 66 and 68 without shearing or disintegrating.

The inner sleeve 66 is press fit on the cylindrical land 72 on the pivot shaft 38 so as to move with the shaft 38. The outer sleeve 68 has a groove 74 formed in the peripheral outer exposed wall 76 in which groove 74 a seal, such as an O-ring 78, is nested. The seal or O-ring 78 is of a size to extend outwardly beyond the wall 76 throughout its length and to sealingly engage the cylindrical land 80 formed inside the undercut 60 of the collar 32. L-shaped clips 82 are fastened to the collar 32, with each clip 82 having an attaching portion 84 bolted at 86 to the end of the collar 32 and a retaining portion 88 bearing against one axial end face 90 of the outer sleeve 68 to urge the sleeve 68 in secured position against the shoulder 62 in the collar 32. The clips 82 are of a size and shape that when fastened by bolt 86 to the collar 32, the sleeve 68 will be rigidly secured to the collar 32 and will not rotate relative thereto. With the sleeve 66 press fit on the shaft 38 and the sleeve 68 secured on the housing 28 and sealed to the housing 28 by the seal or O-ring 78, the shaft 38 and housing 28 can rotate and/or oscillate a limited amount relative to each other without rupturing the elastic ring or disc 70 and without breaking the seal between the opposite sides of the shear seal 65. The elastomeric material of the ring 70 will resist the relative rotation of the sleeves 66,68 tending to stabilize the structure and at the same time will distort to permit the limited relative rotation of the sleeves 66,68 without failure.

The outside diameter of the sleeve 68 is less than the inside diameter of the land 80 in the housing 28 so that one will move relative to the other relatively freely. The O-ring 78 takes up the gap between the sleeve 68 and the housing 28 so as to provide a static seal therebetween. The O-ring 78 will slide or roll relative to the land 80 during insertion or removal of the shear seal 65 between the housing 28 and the shaft 38 so that the tolerance of the outside diameter of the sleeve 68 and the inside diameter of the land 80 are no longer critical which will reduce costs in making the parts and at the same time improve the sealing ability of the shear seal 65 to the housing 28 due to the sealing characteristics of the seal or O-ring 78. In removing the shear seal, no damage is done to the seal, however, at the very most, the O-ring might be bruised or damaged and will need replacement. Normally, O-rings are replaced when an apparatus using O-rings is overhauled so no unexpected replacement results from the need to possibly replace the O-ring. The cost of an O-ring is low and, therefore, an easy and inexpensive item to replace. Since the outside sleeve 68 does not contact the housing 28 during installation, the shear seal 65 can be installed without any load or stress on the elastomeric ring thereby reducing the possibility of damage to the shear seal during installation. Any number of clips 82 can be used without departing from the invention.

INDUSTRIAL APPLICABILITY

My improved shear seal has application wherever two members are relatively rotatable to a limited degree and where a seal is required between the environments on the opposite sides of the seal. One such application is between a track roller frame and a pivot shaft for a mount for the push arms of a bulldozer blade. One sleeve of the seal is press fit on either the shaft or the frame with the other sleeve being spaced from the radial part of the shaft or frame and being sealed thereto by an O-ring carried by said other sleeve. Said other sleeve is secured to said shaft or frame by clips mounted on said shaft or frame.

Two or more shear seals may be used to protect a critical part and still provide limited relative rotation between the members carrying the critical part.

The O-ring can be mounted in either the inside or outside sleeve and can function in radial or axial directions of the shear seal.

The shear seal 65 can be removed without damage thereto by removing the clips 82, the plate 34, the cap 52, and the plate 50 whereupon the pivot shaft 38 can be removed from the housing 28. The sleeve 66 of the seal 65 can be easily knocked off from the land 72 on the shaft 38 if desired. No damage results to the seal 65 so that it can be reused as desired. Heretofore, in order to disengage one or the other sleeve of the seal from either of the relatively rotatable members, it was often necessary to force the members axially relative to each other, using the elastomeric ring as the force transmitting element, until one of the sleeves broke loose from its seat. This often damaged the elastomeric ring preventing its reuse.

I claim:

1. A shear seal assembly (65) for sealing between two members (28,38) having limited relative rotation therebetween, said seal assembly (65) comprising an inner circular means (66) and an outer circular means (68), one of said circular means (66, 68) being secured with respect to one of said members (28,38), a groove (74) formed in an exposed wall (76) of the other of said circular means (66,68), an elastic means (70) bonded between said inner circular means (66) and said outer circular means (68) to permit limited relative rotation between said circular means (66,68), an elastic seal (78) seated in said groove (74) in said other circular means (66,68) and sealing said other circular means (66,68) to the other of said members (28,38), and fastening means (82) carried by said other member (28,38) and urging said other circular means (66,68) into fixed relationship with said other member (28,38).

2. A shear seal assembly (65) as claimed in claim 1 wherein said fastening means comprises two clips (82,82), each clip (82) having an attaching portion (84) for anchoring to said other member (28,38) and a retaining portion (88) bearing on said other circular means (66,68) to retain the other circular means (66,68) against a shoulder (62) on said other member (28,38).

3. A shear seal assembly (65) as claimed in claim 1 wherein said inner (66) and outer (68) circular means are cylindrically-shaped sleeves and wherein said inner sleeve (66) is press fit on the one member (38) and said outer sleeve (68) has said groove (74) therein.

4. A shear seal assembly (65) for sealing between two members (28,38) having limited relative rotation therebetween, said seal assembly (65) comprising an inner cylindrically-shaped sleeve (66) secured on one of said members (28,38), an outer cylindrically-shaped sleeve (68) having a radially disposed circumferential groove (74) formed in the outwardly facing wall (76) thereof, an elastic means (70) bonded between said inner sleeve (66) and said outer sleeve (68) to permit limited relative rotation between said sleeves (66,68), an elastic seal (78) seated in said groove (74) in said outer sleeve (68) and sealing said outer sleeve (68) to the other of said members (28,38), and anchoring means (82) carried by said other member (28,38) and urging said outer sleeve (68) into fixed relationship on said other member (28,38).

5. A shear seal assembly (65) as claimed in claim 4 wherein said anchoring means comprises two clips (82,82), each clip (82) having an attaching portion (84) for securing to said other member (28,38) and a retaining portion (88) bearing axially on said outer sleeve (68) to retain the sleeve against a shoulder (62) on said other member (28,38).

6. A shear seal assembly (65) for sealing between a first member (28,38) and a second member (28,38) concentrically disposed with respect to each other, said first and second members (28,38) having limited relative rotation with respect to each other, said seal (65) comprising an inner sleeve (66), an outer sleeve (68) and elastomeric means (70) bonded to both of said sleeves (66,68) to permit limited relative rotation between said sleeves (66,68), one of said sleeves (66,68) being press fit to the first of said members (28,38), the other of said sleeves (66,68) having a groove (74) formed concentrically about the exposed wall (76) thereof and being spaced from the second of said members (28,38), an O-ring (78) nested in said groove (74) and sealing said grooved sleeve (66,68) to said second member (28,38), and means (82) for locking said grooved sleeve (66,68) to said second member (28,38).

7. A shear seal assembly (65) as claimed in claim 6 wherein said means (82) for locking said grooved sleeve (66,68) to said second member (28,38) comprises a pair of clips (82,82), each clip (82) being secured to said second member (28,38) and having a portion (88) engaging said grooved sleeve (66,68) to urge said sleeve (66,68) against an abutting surface (62) on said second member (28,38).

8. A shear seal assembly (65) as claimed in claim 6 wherein said first member is a pivot shaft (38), said second member is a tubular housing (28) on a track roller frame (16) and has an opening (60) with a shoulder (62) facing one end thereof, and said first member (38) extends into said opening (60) in said second member (28) with said shear seal operatively connected therebetween.

9. A shear seal assembly (65) as claimed in claim 8 wherein said means (82) is a pair of clips (82) which are secured to said second member (28) and have portions (88) engaging said outer sleeve (68) to urge said outer sleeve (68) into sealing engagement with said shoulder (62) in said tubular housing (28).

* * * * *